(12) United States Patent
Overton et al.

(10) Patent No.: US 8,910,364 B2
(45) Date of Patent: Dec. 16, 2014

(54) AIR BAG HEAT SINK/FILTER SECURING METHOD AND APPARATUS

(75) Inventors: Douglas Earl Overton, Knoxville, TN (US); James Michael Rose, Knoxville, TN (US)

(73) Assignee: Arc Automotive Inc., Knoxville, TN (US)

( * ) Notice: Subject to any disclaimer, the term of this patent is extended or adjusted under 35 U.S.C. 154(b) by 144 days.

(21) Appl. No.: 13/473,940

(22) Filed: May 17, 2012

(65) Prior Publication Data

US 2013/0305516 A1   Nov. 21, 2013

(51) Int. Cl.
B60R 21/26     (2011.01)
B23P 11/00     (2006.01)

(52) U.S. Cl.
USPC ............. 29/428; 280/742; 280/741; 280/740; 29/521

(58) Field of Classification Search
USPC ............ 29/428, 521; 280/741, 736, 737, 742, 280/740
See application file for complete search history.

(56) References Cited

U.S. PATENT DOCUMENTS

| | | | |
|---|---|---|---|
| 4,116,466 A * | 9/1978 | Gehrig | 280/736 |
| RE30,327 E * | 7/1980 | Damon | 280/740 |
| 4,722,551 A | 2/1988 | Adams | |
| 5,024,160 A | 6/1991 | Canterberry et al. | |
| 5,087,070 A | 2/1992 | O'Loughlin et al. | |
| 5,397,544 A * | 3/1995 | Kobari et al. | 422/167 |
| 5,398,967 A | 3/1995 | Carothers et al. | |
| 5,505,488 A | 4/1996 | Allard | |
| 5,531,474 A | 7/1996 | Osborne et al. | |
| 5,564,741 A | 10/1996 | Ward et al. | |
| 5,584,505 A | 12/1996 | O'Loughlin et al. | |
| 5,622,380 A | 4/1997 | Khandhadia et al. | |
| 5,700,973 A | 12/1997 | Siddiqui | |
| 5,951,040 A * | 9/1999 | McFarland et al. | 280/736 |
| 5,984,427 A | 11/1999 | Kettle, Jr. | |
| 6,089,598 A * | 7/2000 | Snyder et al. | 280/740 |
| 6,095,558 A | 8/2000 | Bayer et al. | |
| 6,126,197 A | 10/2000 | Muir et al. | |
| 6,142,519 A * | 11/2000 | Smith | 280/741 |
| 6,276,717 B1 | 8/2001 | Katsuda et al. | |
| 6,314,889 B1 * | 11/2001 | Smith | 102/530 |
| 6,336,660 B1 | 1/2002 | Katsuda et al. | |
| 6,474,684 B1 | 11/2002 | Ludwig et al. | |
| 6,547,275 B2 | 4/2003 | Nakashima et al. | |
| 6,584,911 B2 | 7/2003 | Bergerson et al. | |
| 6,644,206 B2 | 11/2003 | Fogle, Jr. | |
| 6,695,345 B2 | 2/2004 | Katsuda et al. | |
| 6,701,849 B2 | 3/2004 | McFarland et al. | |

(Continued)

FOREIGN PATENT DOCUMENTS

JP      2001114062 A *   4/2001   ............. B60R 21/26

Primary Examiner — Essama Omgba
(74) Attorney, Agent, or Firm — Nixon & Vanderhye, PC

(57) ABSTRACT

A method and apparatus for securing a heat sink/filter positioned between a pressure vessel and a diffuser in an air bag inflator. The pressure vessel is constructed so that upon activation of the inflator of the area of gas exiting the pressure vessel is smaller than the area of gas exiting the diffuser to create pressures in the pressure vessel that are higher than the pressures in the diffuser. This results in deformation of the pressure vessel that is equal to or greater than the deformation of the diffuser to maintain compression of the heat sink/filter between the pressure vessel and the diffuser during activation of the inflator.

4 Claims, 2 Drawing Sheets

(56) References Cited

U.S. PATENT DOCUMENTS

| | | |
|---|---|---|
| 6,796,579 B2 | 9/2004 | Tanaka |
| 6,832,777 B2 | 12/2004 | Tanaka |
| 6,854,395 B2 | 2/2005 | Katsuda et al. |
| 6,875,295 B2 | 4/2005 | Blomquist et al. |
| 6,877,435 B2 | 4/2005 | Daoud |
| 6,983,956 B2 | 1/2006 | Canterberry et al. |
| 7,044,502 B2 | 5/2006 | Trevillyan et al. |
| 7,175,197 B2 | 2/2007 | Iwai et al. |
| 7,597,353 B2 | 10/2009 | Smith et al. |
| 7,665,762 B2 | 2/2010 | Gabler et al. |
| 7,708,798 B2 * | 5/2010 | Krupp et al. .................... 55/525 |
| 7,774,115 B2 | 8/2010 | Breed |
| 7,866,692 B2 | 1/2011 | Windhausen et al. |
| 8,029,017 B2 * | 10/2011 | Schorle et al. ................ 280/736 |
| 8,231,141 B2 * | 7/2012 | Neumayer et al. ............ 280/741 |
| 2005/0098988 A1 * | 5/2005 | Smith .......................... 280/735 |
| 2005/0161924 A1 | 7/2005 | Schoenhuber et al. |
| 2006/0267322 A1 | 11/2006 | Eckelberg |
| 2007/0210567 A1 * | 9/2007 | Krupp et al. ................. 280/736 |
| 2008/0111359 A1 * | 5/2008 | Abaziou ....................... 280/741 |
| 2009/0315307 A1 | 12/2009 | Neumayer et al. |
| 2012/0153602 A1 * | 6/2012 | Fischer ........................ 280/736 |

* cited by examiner

AIR BAG HEAT SINK/FILTER SECURING METHOD AND APPARATUS

BACKGROUND OF THE INVENTION

1. Field of the Invention

The present invention relates to a heat sink/filter securing method and apparatus for an air bag and, more particularly, to such a method and apparatus which prevents the flow of hot gas around the heat sink/filter during deployment of the air bag.

2. Description of the Background Art

Current trends for air bag inflators typically involve reducing package size in an attempt to reduce weight and/or costs. Unfortunately, this strategy often reduces the size of the heat sink/filter as it impacts cost, size, weight and may result in elevated gas temperatures. The current filter technologies often have poor structural integrity and therefore must be supported by secondary means. The typical industry designs with internal heat sinks or filters must account for potential gaps between the filter and pressure vessel during deployment or deflection of the inflator. Typically an internal cup or the like is used to support the filter/heat sink which adds to the cost and weight of the inflator. Without this additional hardware current designs will allow hot exhaust gas to bypass the heat sink or filter which in turn may damage the air bag and/or occupant.

BRIEF SUMMARY OF THE INVENTION

In accordance with the present invention, the heat sink positioned between the pressure vessel and surrounding diffuser is secured in place by intentional deformation of the pressure vessel when the air bag is activated. The construction of the pressure vessel and diffuser is such that contact is always maintained with the heat sink, thereby providing optimal flow through the heat sink at all temperatures and pressures. This is accomplished by reducing operating pressures inside the diffuser to allow slightly less deformation of the diffuser than the larger pressure vessel. The result is a slight interference between the pressure vessel and the diffuser during the combustion process, thereby eliminating any blow-by of any debris or unburned gas generant between the pressure vessel and the heat sink or between the heat sink and the diffuser.

The pressure vessel is constructed so that its deformation is greater than that of the thinner diffuser during deployment of the air bag to maintain the compression of the heat sink so that hot combustion gas is not allowed to flow between the heat sink and the diffuser. The pressure in the region between the diffuser and the pressure vessel is reduced by "choking" the pressure vessel so that the area of gas exiting the pressure vessel is much smaller than the area of gas flowing out of the diffuser, thereby creating much higher pressures in the combustion chamber than in the diffuser. The higher internal pressure creates more deformation of the thicker pressure vessel while the reduced pressure in the diffuser allows it to have further reduced deformation.

DETAILED DESCRIPTION OF THE INVENTION

Figure 1:
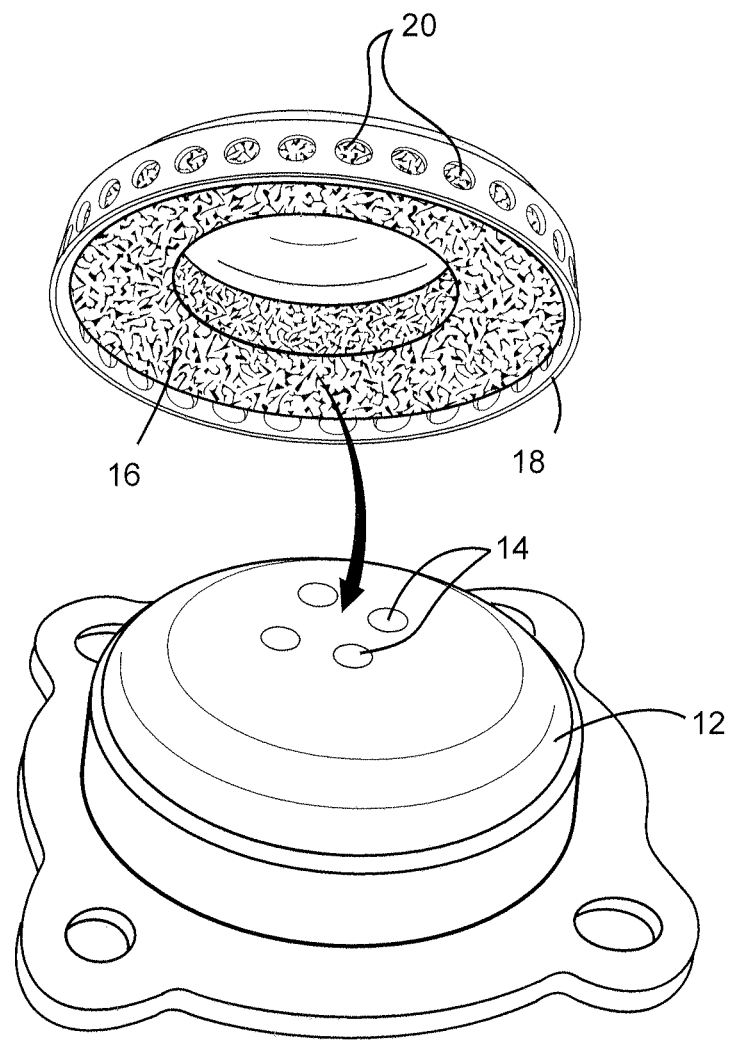
FIG. 1 is a perspective view showing a circular domed pressure vessel for an air bag inflator and the surrounding heat sink and diffuser for the pressure vessel.

FIG. 1 illustrates a circular, domed pressure vessel 12 for an air bag inflator having a plurality of exit orifices 14 and a surrounding heat sink or filter 16 and diffuser 18 wherein hot combustion gas flows through the exit orifices 14 in the pressure vessel 12 and radially outwardly through the heat sink 16 disposed between the diffuser 18 and the pressure vessel 12.

Figure 2:
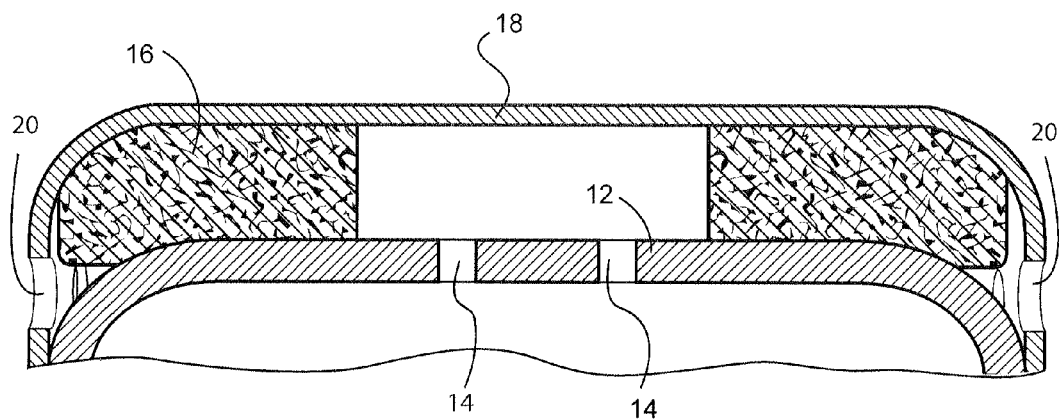
FIG. 2 is an enlarged elevational view in section showing the heat sink positioned between the pressure vessel and diffuser prior to deployment of the air bag.
Figure 3:
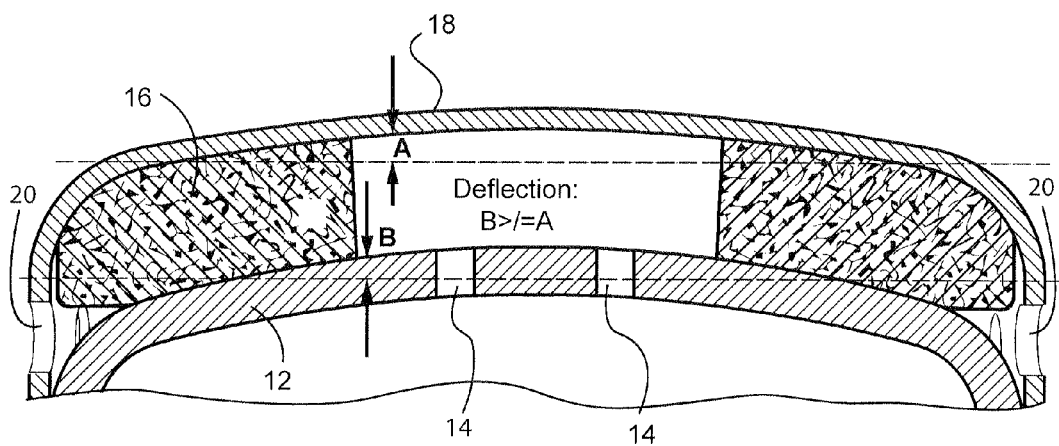
FIG. 3 is a view similar to FIG. 2 showing the deformation of the pressure vessel and the diffuser during deployment of the air bag so that contact is maintained with the heat sink to prevent the flow of any debris or any unburned gas generant between the heat sink and the pressure vessel or the diffuser.

As more specifically shown in FIG. 2, before deployment of the air bag, the heat sink 16 is positioned and compressed between the pressure vessel 12 and the diffuser 18. The size and number of exit orifices 14 in the pressure vessel is controlled so that the area of gas exiting the pressure vessel is much smaller than the area of gas flowing out of the diffuser 18, thereby creating much higher pressures in the combustion chamber in the pressure vessel 12 than in the diffuser. This higher internal pressure in the pressure vessel 12 creates more deformation in the thicker pressure vessel while the reduced pressure in the diffuser 18 allows the much thinner diffuser to have further reduced deformation to ensure that the heat sink 16 is compressed between the pressure vessel 12 and the diffuser 18 so that there is no "blow-by" of any debris or unburned gas generant between the pressure vessel 12 and the heat sink 16 or between the heat sink 16 and the diffuser 18, as shown in FIG. 3. In other words, during deployment of the air bag, the deformation B of the pressure vessel 12 is greater than or equal to the deformation A of the diffuser 18 to maintain compression of the heat sink 16, as further shown in FIG. 3.

Because of the novel construction of the present invention, it is not necessary to support the heat sink with a device such as a cup, retainer or the like, thereby reducing the weight and cost of the inflator.

Although a circular inflator with a domed pressure vessel and surrounding circular heat sink and diffuser are shown in the drawings, it is noted that the method and apparatus of the present invention may be applied to an inflator of any suitable type and configuration.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. Apparatus for securing a heat sink/filter in an air bag inflator, comprising:
   a pressure vessel having a plurality of exit apertures;
   a diffuser surrounding a portion of the pressure vessel for receiving hot inflation gas from the exit apertures when the inflator is activated;
   the heat sink/filter being positioned and compressed between and in contact with the pressure vessel and the diffuser prior to activation of the inflator;
   the pressure vessel being constructed so that upon activation of the inflator the area of gas exiting the pressure vessel is smaller than the area of gas exiting the diffuser to create pressures in the pressure vessel that are higher than the pressures in the diffuser;

whereby the deformation of the pressure vessel is equal to or greater than the deformation of the diffuser to maintain the compression of the heat sink/filter between the pressure vessel and the diffuser and to prevent any debris or unburned gas generant from flowing between the heat sink and the pressure vessel or between the heat sink and the diffuser.

2. The apparatus of claim 1 wherein the area of the gas exiting the pressure vessel is controlled by the number and size of the exit apertures.

3. A method of securing a heat sink/filter in an air bag inflator comprising:

positioning and compressing the heat sink/filter between and in contact with a pressure vessel and a diffuser prior to activation of the inflator;

constructing the pressure vessel so that upon activation of the inflator the area of gas exiting the pressure vessel is smaller than the area of gas exiting the diffuser to create pressures in the pressure vessel that are higher than the pressures in the pressure diffuser;

whereby the deformation of the pressure vessel is equal to or greater than the deformation of the diffuser to maintain the compression of the heat sink/filter between the pressure vessel and the diffuser and to prevent any debris or unburned gas generant from flowing between the heat sink and the pressure vessel or between the heat sink and the diffuser.

4. The method of claim 3 further comprising controlling the number and size of the exit apertures to determine the area of gas exiting the pressure vessel.

\* \* \* \* \*